Nov. 18, 1924.
C. E. ECKRODE ET AL
1,516,004
SHOCK ABSORBER
Filed April 14 1923   3 Sheets-Sheet 1
Fig. 1.
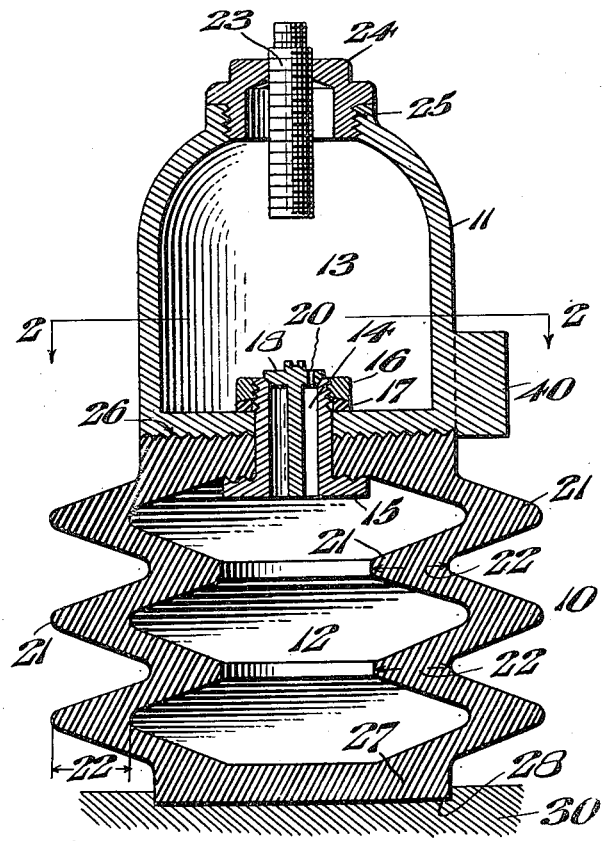
Fig. 2. ON LINE 2-2. FIG. 1.
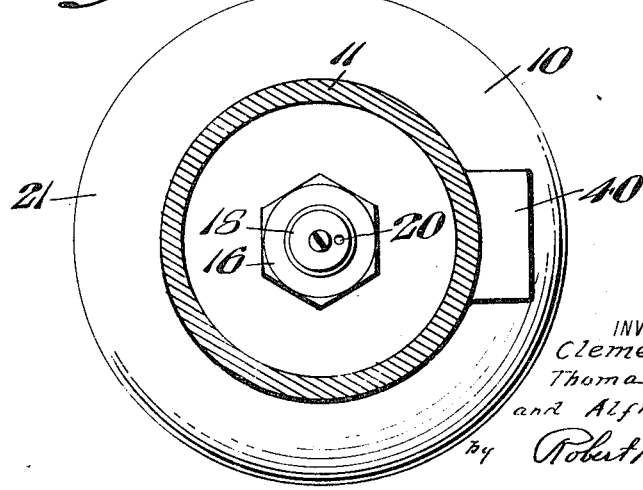
INVENTOR
Clement E. Eckrode,
Thomas L. Acken,
and Alfred Weiland
by Robert M. Barr
ATTORNEY Nov. 18, 1924.

C. E. ECKRODE ET AL

SHOCK ABSORBER

Filed April 14 1923    3 Sheets-Sheet 2

1,516,004

INVENTOR
Clement E. Eckrode,
Thomas L. Acken,
and Alfred Weiland.
By Robert M. Barr
ATTORNEY

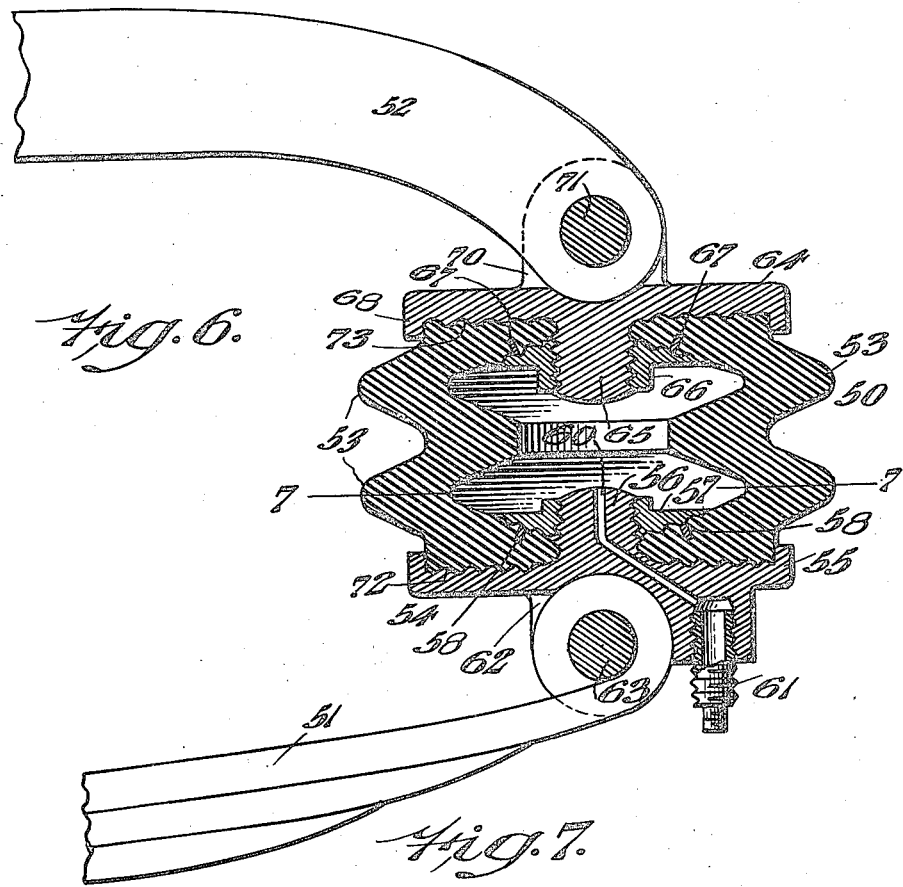
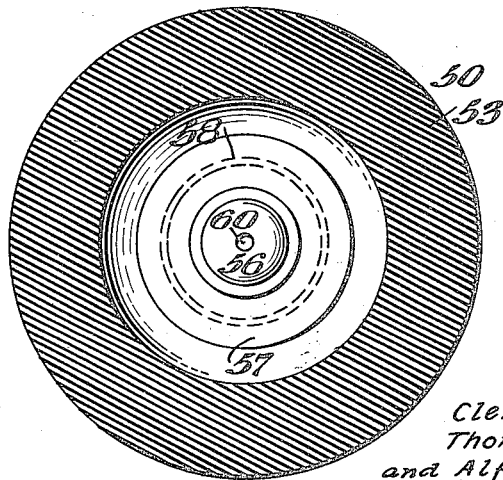

Patented Nov. 18, 1924.

1,516,004

UNITED STATES PATENT OFFICE.

CLEMENT E. ECKRODE, OF NEW BRUNSWICK, THOMAS L. ACKEN, OF NEWARK, AND ALFRED WEILAND, OF EAST ORANGE, NEW JERSEY, ASSIGNORS TO PNEUMATIC APPLIANCES CORPORATION, OF NEW BRUNSWICK, NEW JERSEY, A CORPORATION OF NEW JERSEY.

SHOCK ABSORBER.

Application filed April 14, 1923. Serial No. 631,977.

*To all whom it may concern:*

Be it known that we, CLEMENT E. ECKRODE, THOMAS L. ACKEN, and ALFRED WEILAND, citizens of the United States, and residents, respectively, of New Brunswick, county of Middlesex, State of New Jersey, Newark, county of Essex, State of New Jersey, and East Orange, county of Essex, State of New Jersey, have invented certain new and useful Improvements in Shock Absorbers, of which the following is a specification.

Some of the objects of the present invention are to provide an improved compression member for absorbing shocks and neutralizing rebound following such shocks; to provide means cooperating with the ordinary springs of a vehicle to support the load and minimize shocks caused by obstructions or irregularities of the road; to provide a two chambered inter-communicating device, one member of which is flexible and expansible and the other member of which is rigid and inexpansible, and providing a medium under pressure in the two chambers; to provide an improved shock absorber wherein a medium under pressure is forced from one part of the device to another under impact; to provide means for eliminating rebound of the springs supporting a load; and to provide other improvements as will hereinafter appear.

Figure 5:
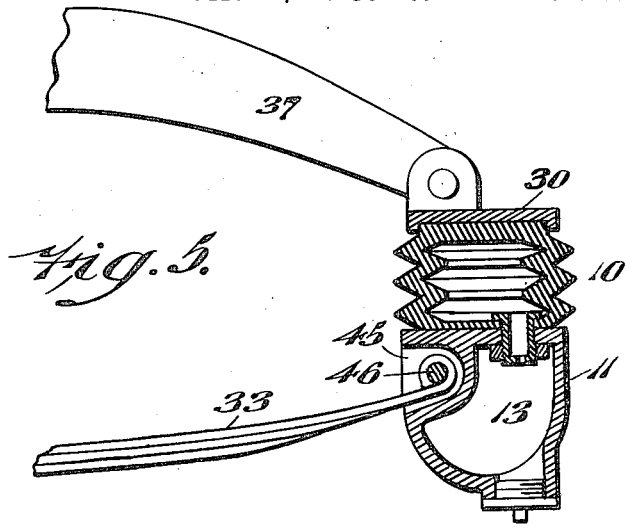
Figure 4:
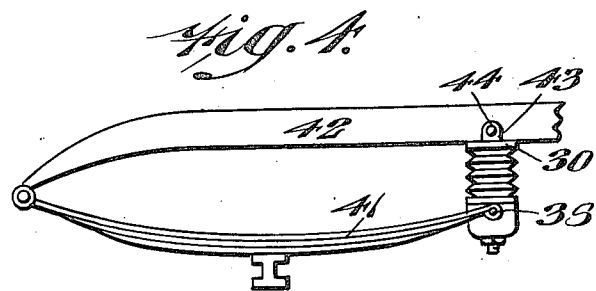
Figure 3:
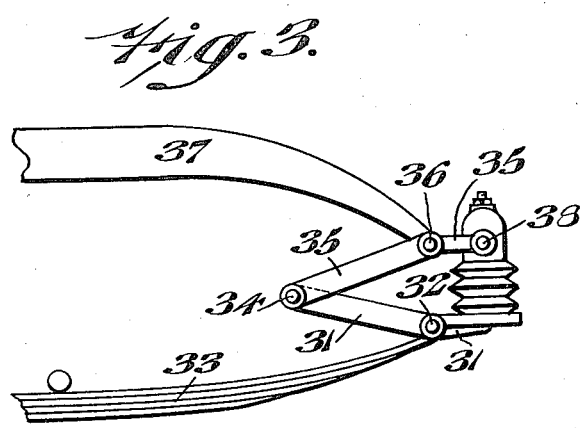

In the accompanying drawings, Fig. 1 represents a sectional elevation of a shock absorber embodying one form of the present invention; Fig. 2 represents a section on line 2—2 of Fig. 1; Fig. 3 represents a side elevation of the device showing one means for mounting the same upon the springs of a motor car or other spring supported structure; Fig. 4 represents a side elevation of another form of mounting where the device is applied to the rear end of a front spring of a vehicle; Fig. 5 represents a sectional elevation of another form of the invention; Fig. 6 represents a sectional elevation of a modified form of the invention; and Fig. 7 represents a section on line 7—7 of Fig 6.

Referring to the drawings, one form of the present invention comprises a shock and rebound absorbing means formed by a compression and expansion member 10, of rubber or any other suitable flexible material, and a casing 11 of metal or any other suitable rigid material. The member 10 is of generally corrugated cylindrical form closed at one end and forms a chamber 12 which is arranged to communicate with a reservoir 13 formed by the casing 11.

In order to rigidly fasten the member 10 to the casing 11 the two opposed ends of these members are apertured to receive a bushing 14 having a head 15 which is located in the chamber 12 and seats against the inner wall of the apertured end of the member 10. The body portion of the bushing 14 projects into the casing 11 and is threaded to receive a fastening nut 16 so that the two parts of the device can be rigidly clamped together. A packing ring 17 is preferably interposed between the nut 16 and the end wall of the casing 11 to prevent leakage from one chamber to the other.

For the purpose of controlling the passage of compressed air or any other medium under pressure, there is a check valve 18 mounted in the bushing 14 and seating upon the end of the bushing which extends into the reservoir 13 so that the air or other medium under pressure is free to pass from the chamber 12 to the reservoir 13 but can only return in a predetermined restricted manner. To this end the valve 18 is provided with a port or restricted passage 20 which forms a normally open communication between the reservoir 13 and the chamber 12 and as a result any air expelled by compression from the chamber 12 can return only by way of the bleed port or restricted passage 20.

In order that the expansible cylinder 10 may, in operation, be compressed and expanded axially, it is formed with internal and external corrugations 21 arranged in any suitable relation to obtain the desired end, though it should be noted that the thickness of the walls of the cylinder 10 is varied to the extent that each corrugation is materially thickened through its apex portion as indicated at 22. This stiffening of the flexible enveloping wall of the chamber 12 causes it to resist internal pressure directed radially outward and increases the effective shock absorbing qualities of the cylinder under its axle expansion and compression.

As a means for introducing air or other medium under pressure to the reservoir 13 and the chamber 12, the casing 11 is provided with a suitable valve structure such, for example, as a standard pneumatic tire valve 23 which is secured to and enters the casing 11 by way of a nut 24 threaded into the casing wall. Preferably the threaded opening 25 for the nut 24 is located in substantially alined relation with respect to the check valve 18 so that access may be had to the latter for assembling, repair or replacement.

To more effectively interlock the cylinder member 10 to the casing 11, the latter has its cylinder abutting face provided with corrugations 26 or other irregular formation into which the softer material is pressed under the clamping action of the nut 16.

For securing the free closed end of the member 10 to an associated fixture, it is formed as a cylindrical extension 27 of relatively wide diameter which may be seated in or pressed into a seat or socket 28 formed in a supporting bracket or plate 30.

While the device of the present invention can be employed in various structures for minimizing and overcoming shocks produced by moving parts, it is more particularly employed in connection with motor vehicles to promote ease of riding by compensating for the irregularities of the roadway which is not done by the ordinary spring suspension. By reference, therefore, to Fig. 3 of the drawings one means for mounting the shock absorbing device of Fig. 1, is shown comprising a lever 31 pivoted to a bolt 32 in the end of the leaf spring 33 and supporting on one end the plate 30 of the cylinder 10 while its opposite end is pivoted by a pin 34 to a second lever 35. This lever 35 is pivotally supported by a bolt 36 from the vehicle side frame 37 and has its end pivotally mounted on a stud 38 which is fast to a boss 40 formed on the casing 11. By this construction the expansible member 10 is supported between the plate 30 and the casing 11 and interposed between the rear vehicle spring 33 and the vehicle frame 37.

In the form shown in Fig. 4 the shock absorbing device is interposed between the rear end of one of the springs 41 of the vehicle and the frame 42, the expansible member 10 in this arrangement having its plate 30 made fast to the frame 42 by a lug 43 and bolt 44 while the casing 11 has its stud 38 forming a pivot for the end of the spring 41.

In the form shown in Fig. 5 the device is arranged as a pneumatic shackle to directly connect the vehicle frame 37 and one end of the spring 33, the casing 11 being formed with a pocket 45 to receive the end of the spring 33 and wherein it is pivoted on the bolt 46. The plate 30 is rigidly secured to the frame by a lug 47 and a bolt 48 so that the expansible element 10 is subject to compressive action between the frame 37 and the spring 33.

When the shock absorber has been installed upon a vehicle, a source of air under pressure is connected to the valve 23 and sufficient air pressure created in the reservoir 11 and member 10 to cause the latter to be expanded to the amount required to support the load. With this accomplished the valve 23 is closed and the device is ready for use. When the wheel of the vehicle strikes an obstruction or other irregularity in the road, the shock is taken up by the spring 33 in the usual manner and then transmitted to the plate 30 so that the cylinder 10 is compressed, thereby reducing its volume and causing some of its air content to be forced through the port controlled by the valve 18 and to thus be trapped in the reservoir 11. As the member 10 only expands by internal pressure it returns slowly to its normal position because the trapped air can only leak back through the restricted port 20 to again establish equal pressures in the two chambers. While the re-establishment of normal conditions takes place very quickly, it is slow relative to the rebound of the springs and therefore functions effectively to counter-act such rebound, and as a result the complete action of the device is to reduce road shocks to a minimum and eliminate rebound of the springs. Furthermore, the arrangement of the shock absorber is such that it takes the place of the usual spring shackles.

In connection with the member 10 it should be noted that the V-type of corrugations are formed with a relatively deep section 22 which resists lateral or radial expansion and as a result the full expansion of the member 10 takes place in the direction of its axis, or in such a direction as to apply the force vertically to lift the load and support it upon the usual spring construction.

In Figs. 6 and 7 another form of the invention is shown wherein a pneumatic or inflated cushioning member 50 formed of rubber or other suitable material serves in the place of the shackle ordinarily employed for connecting the end of a vehicle spring 51 to the side frame 52 of the vehicle. In the present construction the member 50 is provided with transversely arranged corrugations 53 having walls of increased thickness at suitable locations to resist lateral or side expansion of the member and ensure expansion in an axial direction.

In order to properly support the member 50, it is seated at one end in a base plate 54 of general circular form having a marginal flange 55 to receive the end of the member 50. This plate 54 is also provided with a threaded, centrally disposed stem 56 which passes through the end wall of the member 50 and is threaded into a flanged nut 57 to hold the parts rigidly clamped together. Preferably the nut 57 is provided with anchoring means 58 whereby it becomes a fixed part of the member 50. The stem 56 has a port 60 leading through the plate to a valve 61 of the type used for pneumatic tires so that the member 50 can be inflated in the required manner. The plate 54 is provided with an apertured lug 62 by which it is secured by a bolt 63 to the end of the spring 51. The upper end of the member 50 is similarly held by a top plate 64 having an integral stem 65 passing through the wall of the member 50 and threaded into a flanged nut 66 fixed to the member 50 by anchoring means 67. A marginal flange 68 is formed on the plate 64 to seat the end of the member 50, while an apertured lug 70 serves to receive a bolt 71 for fastening the plate 64 to the frame 52.

To more intimately connect the two plates 54 and 64 with the member 50, they are respectively provided with suitable corrugations 72 and 73 which seat in the ends of the member 50.

It should therefore be noted that the pneumatic element 50 has very essential characteristics as regards expansion, and is so constructed that it does not function in the manner of the usual air filled compressible body, like a pneumatic tire or a spherical sack, such as are found in structures heretofore devised in an attempt to produce a shock absorber. To the contrary, the element 50 has very definite variation of its wall thickness which takes the form of a taper from a line or lines where expansion is necessary to a line or lines where expansion is to be resisted, and as a result the application of external pressure does not produce the usual compressive action and increase the internal pressure, but instead causes certain wall portions of the element 50 to expand so that the cubical content remains substantially constant and the internal pressure in consequence substantially unchanged. The riding result is manifested in alternate expansion and contraction of portions of the bounding wall of the element 50 in a manner suggestive of a breathing action, and the vehicle is relieved of shocks and has a pronounced floating action. The proper expanding and contracting of the element 50 under external pressure has been found after long experiment to depend largely upon the relative arrangement of the element 50 with respect to the lines of applied force, and the preferred construction is therefore one in which the element 50 has lateral dimensions bringing its sides beyond or outside the lines of pressure upon the top and bottom thereof. This throws the compressive force as transmitted by the base plate 55 and top plate 64 in direct line with the chamber contained air and produces the desired free expansion and contraction of those portions of the side walls which are designed to yield under pressure.

The above-described shackle construction is a very important feature of applicants' invention in that it allows the spring to have its full shock absorbing movement but adds to the effectiveness of the shock absorption by eliminating the transmission of any of the impact passing by way of the end of the spring and the frame. Also this shackle construction has a very marked snubbing action during the rebound of the spring, and in consequence the entire shackle construction gives a result not heretofore attained because the spring has its full value as a spring and to which is added the absorbing qualities of the shackle. In the ordinary construction which embodies a rigid shackle between the end of the spring and the frame there is a certain amount of jar transmitted by this direct connection regardless of whether or not there are supplemental shock absorbers located elsewhere between the spring and the frame or between the axle and the frame, and in this respect applicants' invention is differentiated from anything of this character heretofore devised.

While but two forms are shown in which this invention may be embodied, it is to be understood that the invention is not limited to any specific construction, but might be applied in various forms without departing from the spirit of the invention or the scope of the appended claims.

Having thus described our invention, we claim:

1. The combination of a vehicle frame, a vehicle spring, and a shock absorber comprising a hollow member formed of laterally extending expansible side walls converging to a circumferential non-expansible pressure resisting area, a top plate fixed to one end of said member and connected to said vehicle frame, a base plate fixed to the other end of said member and connected to said vehicle spring, and means for inflating said member.

2. The combination of a vehicle frame, a vehicle spring and a shock absorber comprising a pneumatic member having expansible walls formed with a centrally disposed non-expansible pressure resisting area, a top plate fixed to one end of said member and connected to said vehicle frame, a base plate fixed to the other end of said member and connected to said vehicle spring, said pneumatic member extending laterally beyond the confines of both of said plates whereby said expansible walls are free to expand and contract and said non-expansible area resists side movement.

3. The combination of a vehicle part, a vehicle spring, a top plate secured to said vehicle part, a base plate secured to said vehicle spring, an inflated member fixed at opposite ends respectively to said top and base plates and having expansible side walls out of the path of movement of said plates under impact and merging into a centrally disposed pressure resisting area.

4. The combination of a vehicle part, a vehicle spring, a top cap plate secured to said vehicle part, a base cap plate secured to said vehicle spring, a hollow resilient member having an end seating in said top cap plate and an end seating in said base cap plate, and expansible side walls projecting circumferentially beyond the confines of both of said plates whereby said member is free to expand and contract and merging into a non-expansible pressure resisting area between said area and the area of pressure.

Signed at New Brunswick, in the county of Middlesex and State of New Jersey, this 2d day of April, 1923.

CLEMENT E. ECKRODE.
THOMAS L. ACKEN.
ALFRED WEILAND.

Witness:
ELIZABETH H. HARDING.